United States Patent
Shin et al.

(10) Patent No.: US 11,848,978 B2
(45) Date of Patent: Dec. 19, 2023

(54) SYSTEM AND METHOD FOR REMOTE SUPPORT SERVICE

(71) Applicant: SAMSUNG SDS CO., LTD., Seoul (KR)

(72) Inventors: Seung Yong Shin, Seoul (KR); Yu Hwan Keum, Seoul (KR); Dae Hyuck Im, Seoul (KR); You Dong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 51 days.

(21) Appl. No.: 17/513,077

(22) Filed: Oct. 28, 2021

(65) Prior Publication Data
US 2022/0131928 A1 Apr. 28, 2022

(30) Foreign Application Priority Data
Oct. 28, 2020 (KR) .................. 10-2020-0141149

(51) Int. Cl.
*H04L 67/025* (2022.01)
*H04L 41/5022* (2022.01)
(Continued)

(52) U.S. Cl.
CPC .......... *H04L 67/025* (2013.01); *H04L 9/0822* (2013.01); *H04L 41/5009* (2013.01);
(Continued)

(58) Field of Classification Search
CPC . H04L 67/025; H04L 9/0822; H04L 41/5009; H04L 41/5022; H04L 41/509;
(Continued)

(56) References Cited

U.S. PATENT DOCUMENTS

| 9,788,179 B1* | 10/2017 | Sharifi | ............ H04W 4/18 |
| 2011/0126130 A1* | 5/2011 | Lieb | ............ G06F 3/1454 |
| | | | 715/753 |

(Continued)

FOREIGN PATENT DOCUMENTS

| KR | 10-2016-0047905 A | 5/2016 | |
| WO | WO-2010024112 A1 * | 3/2010 | ......... G06K 7/1465 |

*Primary Examiner* — Kevin T Bates
*Assistant Examiner* — Ranjan Pant
(74) *Attorney, Agent, or Firm* — NSIP Law (57) ABSTRACT

A method for a remote support service performed by a remote control device includes receiving, from a controlled terminal, a first image packet including image data for a first image, rendering the first image based on the image data, transmitting a control packet including control data corresponding to an administrator's input to the controlled terminal when the administrator's input for the rendered first image is detected, receiving a second image packet including image data for a second image obtained by capturing the screen of the controlled terminal and identification information on whether or not the second image data is an image generated for the first time after a control event based on the control data is performed, determining whether or not to render the second image based on the identification information, and rendering the second image based on the image data for the second image according to the determination result.

16 Claims, 5 Drawing Sheets

(51) Int. Cl.
*H04L 41/50* (2022.01)
*H04L 9/40* (2022.01)
*H04L 9/08* (2006.01)
*H04L 41/5009* (2022.01)

(52) U.S. Cl.
CPC ........ *H04L 41/509* (2013.01); *H04L 41/5022* (2013.01); *H04L 63/0869* (2013.01)

(58) Field of Classification Search
CPC ............... H04L 63/0869; H04L 65/762; H04L 65/4015; G06F 3/1454; G06T 11/00; G09G 5/227
See application file for complete search history.

(56) References Cited

U.S. PATENT DOCUMENTS

| | | | |
|---|---|---|---|
| 2011/0208857 A1* | 8/2011 | Gentile | ................... H04L 67/06 709/224 |
| 2015/0199074 A1* | 7/2015 | Wu et al. | |
| 2018/0285053 A1* | 10/2018 | Fang | .......................... G06F 9/44 |
| 2020/0042286 A1* | 2/2020 | Bui | ....................... G10L 15/063 |

* cited by examiner

SYSTEM AND METHOD FOR REMOTE SUPPORT SERVICE

CROSS-REFERENCE TO RELATED APPLICATION

This application claims the benefit under 35 USC § 119(a) of Korean Patent Application No. 10-2020-0141149, filed on Oct. 28, 2020, in the Korean Intellectual Property Office, the entire disclosure of which is incorporated herein by reference for all purposes.

BACKGROUND

1. Field

The disclosed embodiments relate to a technique for providing a real-time remote support service in a mobile environment.

2. Description of Related Art

Recently, as application of work through an application of a controlled terminal has been expanded and many companies are aiming to provide mobile-oriented services, the center of work is shifting to the mobile environment. In addition, as processing of work using the controlled terminal increases in enterprise, an issue of corresponding trouble shooting is continuously emerging.

Conventionally, as a solution to such trouble shooting, an inquiry method through e-mail, an inquiry method through a phone, an inquiry method through a messenger, an inquiry method through offline, etc. were mainly used, but in order to overcome geographical limitations and difficulties in mutual communication, an inquiry method through remote support is being used.

However, in the case of the conventional inquiry method through remote support, the instantaneous changed screen that occurs in the controlled terminal due to control of an administrator is not delivered to the administrator, and thus there is a difficulty in real-time interaction between the controlled terminal and the administrator.

SUMMARY

The disclosed embodiments are intended to provide a means for improving administrator convenience by providing a remote support service.

In one general aspect, a remote support server including one or more processors are configured to receive, from a controlled terminal, a first image packet including image data for a first image obtained by capturing a screen of the controlled terminal, render the first image based on the image data for the first image, transmit a control packet including control data corresponding to an administrator's input to the controlled terminal when the administrator's input for the rendered first image is detected, receive, from the controlled terminal, a second image packet including image data for a second image obtained by capturing the screen of the controlled terminal and identification information on whether or not the second image data is an image generated for the first time after a control event based on the control data is performed in the controlled terminal, and determine whether or not to render the second image based on the identification information and renders the second image based on the image data for the second image according to the determination result.

The one or more processors are further configured to skip rendering of the second image when the second image data is not the image generated for the first time.

The one or more processors are further configured to render the second image when the second image data is the image generated for the first time.

The control packet may further include index information of the first image.

In another general aspect, there is provided apparatus for a force running of remote support including one or more processors are configured to transmit a first image packet including image data for a first image obtained by capturing a screen of the controlled terminal to a remote support server, receive a control packet including control data for the controlled terminal from the remote support server, and transmit a second image packet including image data for a second image generated for the first time after a control event is performed by performing the control event corresponding to the control data and identification information indicating that the second image is an image generated for the first time after the control event based on the control data is performed to the remote support server.

The first image packet may further include index information of the first image.

The second image packet may further include index information of the second image.

The control packet may further include index information of the image rendered by the remote support server.

The one or more processors are further configured to compare the index information included in the control packet with the index information of the second image and adjust resolution of the second image when the comparison result is equal to or greater than a preset threshold.

In another general aspect, there is provided a method for a remote support service performed by a remote support server that includes one or more processors may include receiving, from a controlled terminal, a first image packet including image data for a first image obtained by capturing a screen of the controlled terminal, rendering the first image based on the image data for the first image, transmitting a control packet including control data corresponding to an administrator's input to the controlled terminal when the administrator's input for the rendered first image is detected, receiving, from the controlled terminal, a second image packet including image data for a second image obtained by capturing the screen of the controlled terminal and identification information on whether or not the second image data is an image generated for the first time after a control event based on the control data is performed in the controlled terminal, determining whether or not to render the second image based on the identification information, and rendering the second image based on the image data for the second image according to the determination result.

The method for the remote support service may include skipping, by the processor, rendering of the second image when the second image data is not the image generated for the first time.

The method for the remote support service may include rendering, by the processor, the second image when the second image data is the image generated for the first time.

The control packet may further include index information of the first image.

In another general aspect, there is provided a method for a remote support service performed by a controlled terminal that includes one or more processors may include transmitting a first image packet including image data for a first image obtained by capturing a screen of the controlled terminal to a remote support server, receiving a control packet including control data for the controlled terminal from the remote support server, and transmitting a second image packet including image data for a second image generated for the first time after a control event is performed by performing the control event corresponding to the control data and identification information indicating that the second image is an image generated for the first time after the control event based on the control data is performed to the remote support server.

The first image packet may further include index information of the first image.

The second image packet may further include index information of the second image.

The control packet may further include index information of the image rendered by the remote support server.

The method for the remote support service may further include comparing, by the one or more processors, the index information included in the control packet with the index information of the second image and adjusting, by the one or more processors, resolution of the second image when the comparison result is equal to or greater than a preset threshold.

According to the disclosed embodiments, it is possible to increase the interaction between the administrator and the controlled terminal based on the real-time screen change in providing the remote support service.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present disclosure may unnecessarily obscure the subject matter of the disclosed embodiments, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
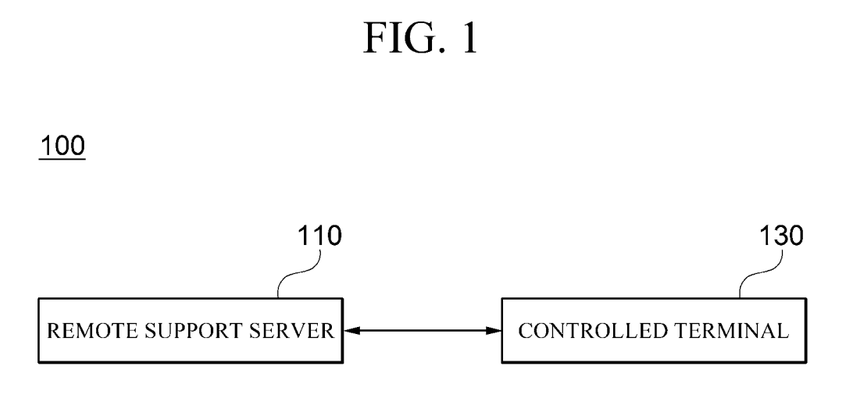
FIG. 1 is a configuration diagram for describing a remote support system according to an embodiment.

FIG. 1 is a configuration diagram illustrating an apparatus 100 for a remote support service according to an embodiment.

As illustrated, the apparatus 100 for the remote support service according to an embodiment includes a remote support server 110 and a controlled terminal 130.

According to an embodiment, the remote support server 110 and the controlled terminal 130 may be implemented using one or more physically separated devices, or may be implemented by one or more processors or a combination of one or more processors and software, and may not be clearly distinguished in specific operation unlike the illustrated example.

According to an embodiment, the remote support server 110 is a computing device operated by an administrator to provide the remote support service to the controlled terminal 130, and may be, for example, a PC or a notebook computer. In the following embodiments, the remote support service refers to a service in which the remote support server 110 side administrator remotely connects to the controlled terminal 130 through the remote support server 110 to diagnose and process a problem or error in real time when the problem or error occurs in performing a specific function in the controlled terminal 130.

To this end, the remote support server 110 may include a remote support viewer for providing the remote support service, and transmit a series of control signals to the controlled terminal 130 through the remote support viewer and share screen information of the controlled terminal 130.

Meanwhile, a relay server is a server that relays data between the remote support server 110 and the controlled terminal 130. The relay server serves to maintain a bidirectional connection between the remote support server 110 and the controlled terminal 130 and record logs related to the remote support server 100 and the controlled terminal 130. In this case, data transmitted and received between the relay server, the remote support server 110, and the controlled terminal 130 may be encrypted data.

Meanwhile, the controlled terminal 130 is a terminal that is remotely connected to receive the remote support service of the administrator of the remote support server 110, and may be, for example, a desktop PC, a laptop computer, a tablet PC, or a smart phone.

According to an embodiment, the controlled terminal 130 may include an agent (or application) for executing the remote support service, and may receive the remote support service from the remote support server 110 through the agent. The agent may perform various functions such as, for example, screen sharing for a remote support service, handling of events such as an administrator's screen click/execution of an application, and setting of other application.

Hereinafter, the role played by each configuration for providing the remote support service will be described in detail.

According to an embodiment, the remote support server 110 may receive an image packet from the controlled terminal 130 and render image data.

According to an embodiment, the image packet received from the controlled terminal 130 may include image data for a second image obtained by capturing the screen of the controlled terminal 130 and identification information on whether or not the second image data is an image generated for the first time after a control event based on the control data is performed in the controlled terminal 130. An example of the image packet is as follows.

{Image Data of Captured Screen of Controlled Terminal, Index of Image Data, Identification Information}

According to an embodiment, when the administrator's input for the rendered image is detected, the remote support server 110 may transmit a control packet including control data corresponding to the administrator's input to the controlled terminal 130.

According to an embodiment, the control packet may include control data corresponding to the administrator's input for the rendered image and an index of the rendered image. An example of a control packet is as follows.

{Control Data Corresponding to Administrator's Input, Index of Rendered Image}

According to an embodiment, the remote support server 110 may determine whether or not to render the image based on the identification information, and render the image based on the determination.

According to an embodiment, the controlled terminal 130 may transmit image data for the captured screen to the remote support server.

According to an embodiment, the controlled terminal 130 may receive a control packet including control data from the remote control device 110.

According to an embodiment, the controlled terminal 130 may transmit a second image packet including image data for a second image generated for the first time after a control event is performed by performing the control event corresponding to the control data and identification information indicating that the second image is an image generated for the first time after the control event based on the control data is performed to the remote support server 110.

According to an embodiment, the controlled terminal 130 may determine whether or not to adjust resolution of the image data based on the control data for the image of the remote control device 110.

According to one embodiment, the controlled terminal 130 may compare index information included in the control packet with index information of the second image and adjust resolution of the second image when the comparison result is equal to or greater than a preset threshold.

According to an embodiment, the remote support server 110 may receive, from the controlled terminal 130, a plurality of images whose resolution is adjusted for the images whose rendering has been skipped based on a control packet including index information of the images whose renderings have been skipped.

According to an embodiment, when a control packet is not transmitted from the remote support server after resolution adjustment, the resolution may be readjusted.

Figure 2:
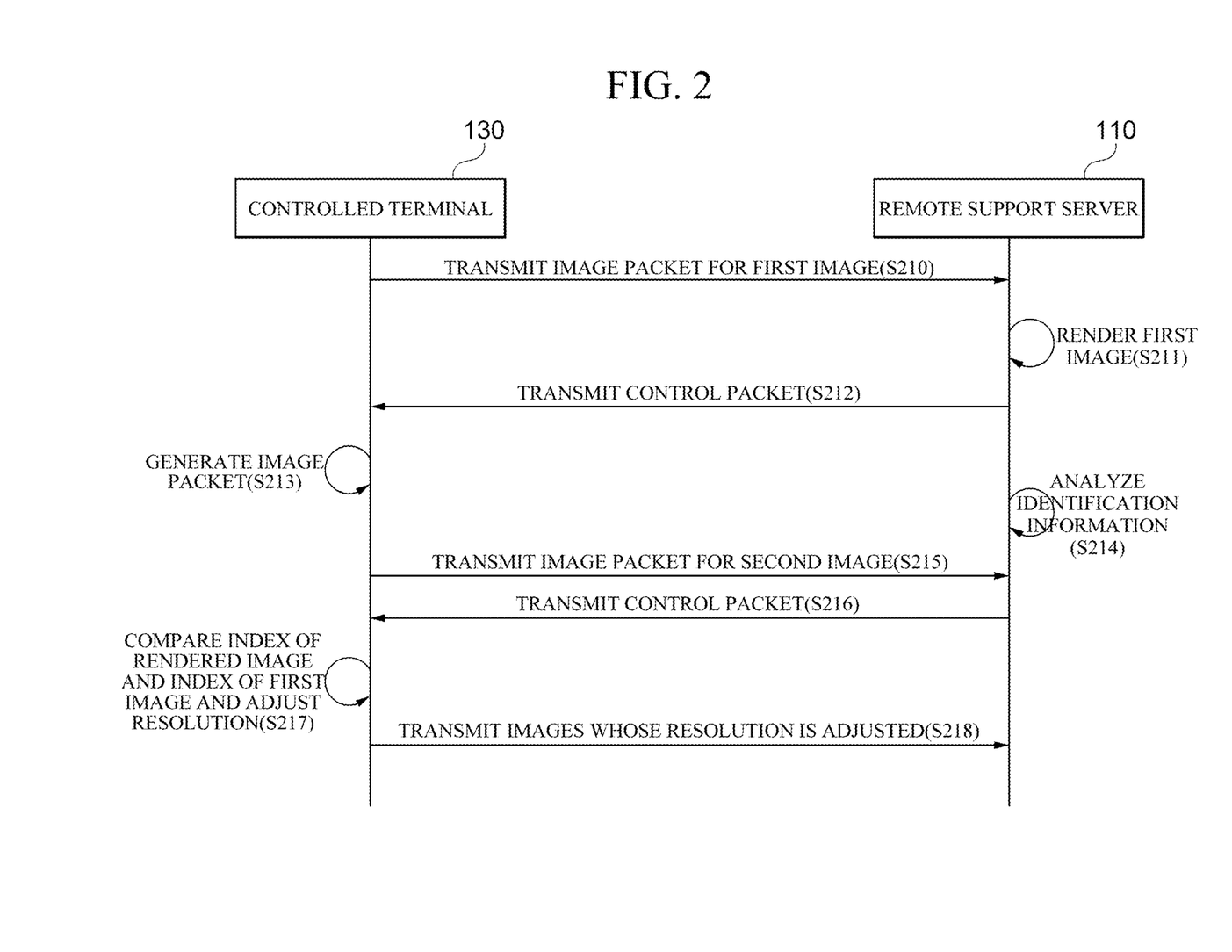
FIG. 2 is a flowchart of a method for a remote support service performed by a remote support system according to an embodiment.

FIG. 2 is a flowchart of a remote support method performed by a remote support system according to an embodiment.

The method illustrated in FIG. 2 may be performed by, for example, the remote support server 110 and the controlled terminal 130 illustrated in FIG. 1.

Referring to FIG. 2, first, in step 210, the controlled terminal 130 may transmit a first image packet including image data for a first image obtained by capturing the screen, an index of the image data, and identification information on whether or not the image is an image generated for the first time after a control event is performed in the controlled terminal.

In step 211, the remote support server 110 may render the first image based on the image data for the first image.

In step 212, when the administrator's input for the rendered first image is detected, the remote support server 110 may transmit a control packet including control data corresponding to the administrator's input to the controlled terminal 130.

In step 213, the controlled terminal 130 may transmit image packets at preset time intervals. In addition, the controlled terminal 130 may perform a control event corresponding to the control data based on the control packet received from the remote support server 110 and generate identification information on whether or not the image is an image generated for the first time after the control event is performed.

In step 214, the remote support server 110 may analyze the identification information to determine, based on the control data, whether or not the image is the image generated for the first time after the control event is performed in the controlled terminal 130.

In this case, when the controlled terminal 130 is not the image data of the second image obtained by capturing by the screen, the index of the image data, and the control event is not the image generated for the first time after the control event is performed in the controlled terminal 130, that is, when the identification information is false, the remote support server 110 may skip rendering of the second image.

When the controlled terminal 130 is not the image data of the second image obtained by capturing by the screen, the index of the image data, and the control event is the image generated for the first time after the control event is performed in the controlled terminal 130, that is, when the identification information is true, the remote support server 110 may render the second image.

In step 216, when the identification information is true, the remote support server 110 may transmit a control packet including index information for the rendered second image.

In step 217, when a difference between the index of the rendered second image and the index of the first image is equal to or greater than a preset threshold, the controlled terminal 130 may adjust resolution of the plurality of images corresponding to the index difference.

In addition, according to an embodiment, when the difference between the index of the rendered second image and the index of the first image is less than or equal to the preset threshold, the controlled terminal 130 may be requested to maintain or increase the resolution.

According to an embodiment, when the difference between the index of the rendered second image and the index of the first image is 8 or more, the controlled terminal 130 may adjust the resolution to be lowered.

The controlled terminal 130 may readjust the resolution when the control packet is not transmitted from the remote support server after the resolution adjustment.

In step 218, the controlled terminal 130 may transmit a plurality of images whose resolution is adjusted to the remote support server 110.

Figure 3:
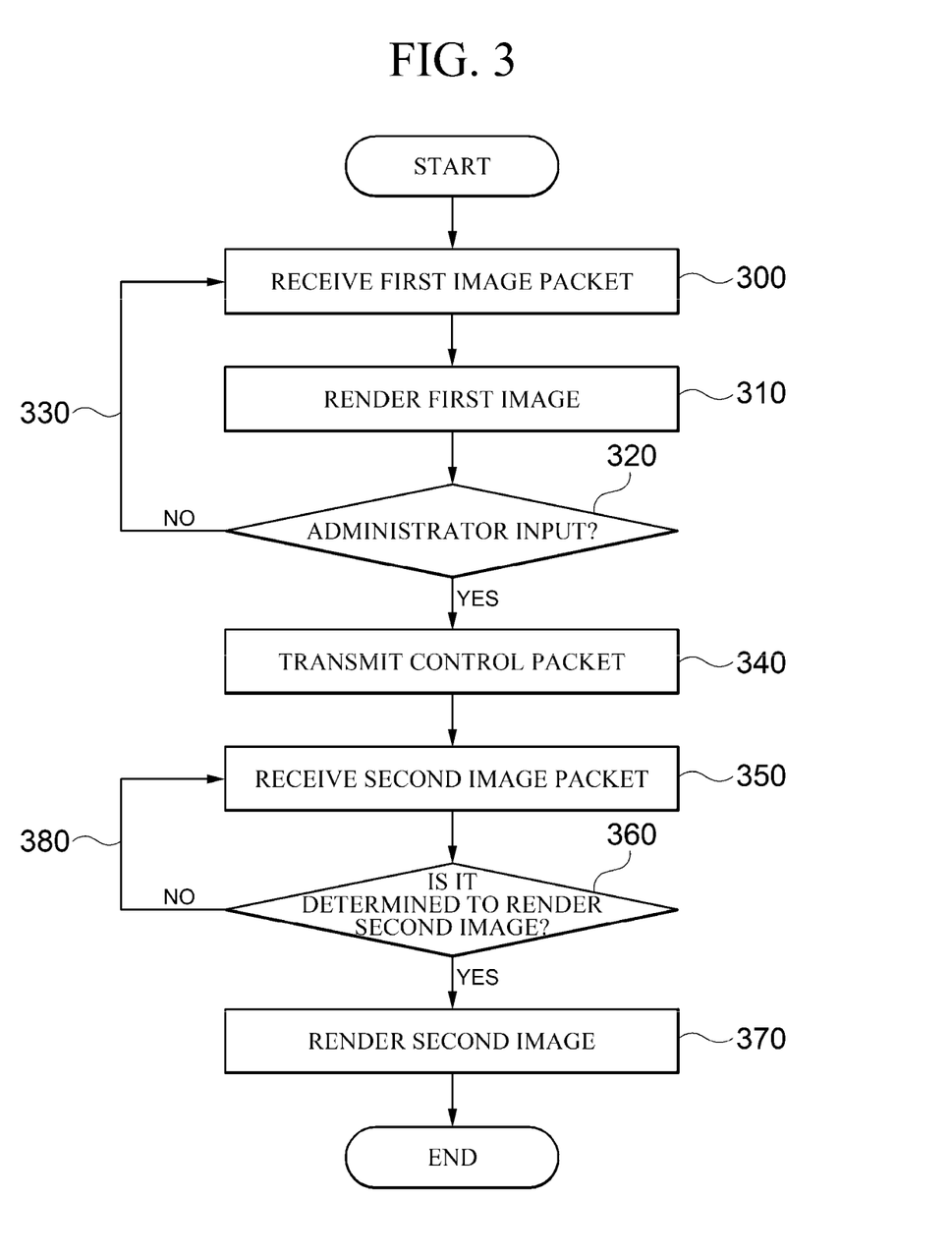
FIG. 3 is a flowchart of a method for a remote support service performed by the remote support server according to an embodiment.

FIG. 3 is a flowchart of a method for a remote support service performed by a remote support server according to an embodiment.

The method illustrated in FIG. 3 may be performed by, for example, the remote support server 110 and the controlled terminal 130 illustrated in FIG. 1.

Referring to FIG. 3, according to an embodiment, first, in step 300, the remote support server 110 may receive, from the controlled terminal 130, a first image packet including image data for a first image obtained by capturing the screen of the controlled terminal 130.

In step 310, the remote support server 110 may render the first image based on the image data for the first image.

In step 320, the remote support server 110 may determine whether or not the administrator' input for the rendered first image is made.

In step 330, when the administrator's input for the rendered first image is not detected, the remote support server 110 may receive a new image packet from the controlled terminal.

In step 340, when the administrator's input for the rendered first image is detected, the remote support server 110 may transmit a control packet including control data corresponding to the administrator's input to the controlled terminal 130.

In step 350, the remote support server 110 may receive, from the controlled terminal 130, a second image packet including image data for a second image obtained by capturing the screen of the controlled terminal 130 and identification information on whether or not the second image data is an image generated for the first time after a control event based on the control data is performed in the controlled terminal 130.

In step 360, the remote support server 110 may determine whether or not to render the second image based on the identification information.

In step 370, when the identification information included in the second image packet is true, that is, when the second image data is that the control event based on control data is an image generated for the first time by the controlled terminal after the controlled event is performed in the controlled terminal 130, the remote support server 110 may perform rendering of the second image data.

In step 380, the identification information included in the second image packet is false, that is, when the second image data is that the control event based on control data is not an image generated for the first time by the controlled terminal after the controlled event is performed in the controlled terminal 130, the remote support server 110 may skip rendering of the second image data.

In addition, the remote support server 110 may skip rendering the second image as a result of the determination, and receive, from the controlled terminal 130, a new image packet including image data for a new image obtained by capturing the screen of the controlled terminal 130 and identification information for the new image.

Figure 4:
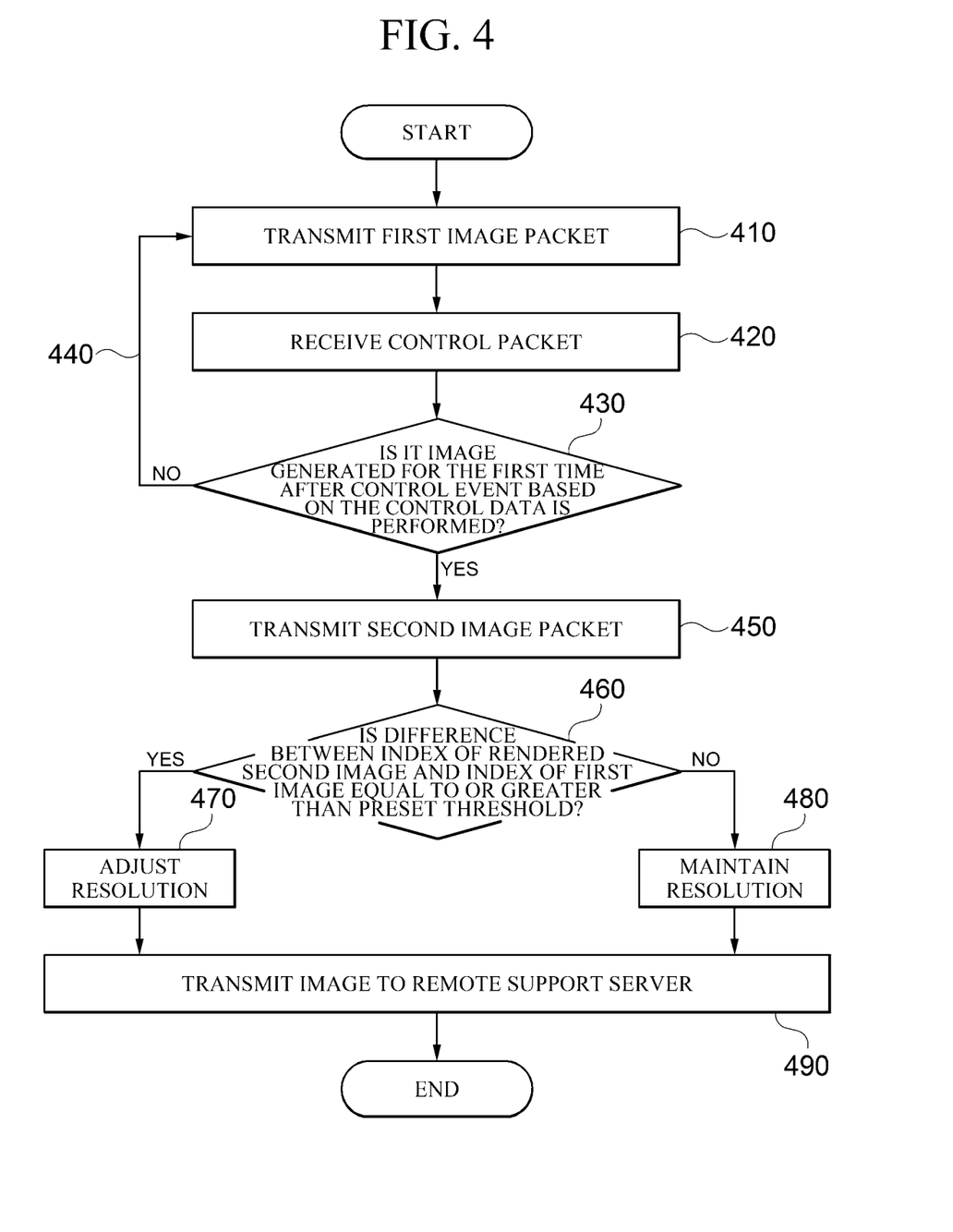
FIG. 4 is a flowchart of a method for a remote support service performed by a controlled terminal according to an embodiment.

FIG. 4 is a flowchart of a remote support method performed by a controlled terminal according to an embodiment.

The method illustrated in FIG. 4 may be performed by, for example, the remote support system 110 and the controlled terminal 130 illustrated in FIG. 1.

Referring to FIG. 4, according to an embodiment, first, in step 410, the controlled terminal 130 may transmit a first image packet including image data for a first image obtained by capturing the screen thereof to the remote support server 110.

In step 420, the controlled terminal 130 may receive a control packet including control data corresponding to an administrator's input for the rendered first image from the remote support server 110.

In step 430, the controlled terminal 130 may determine whether or not the image is an image generated for the first time after the control event based on the control data is performed.

In step 440, when the image is not the image generated for the first time after the control event based on the control data is performed, the controlled terminal 130 may additionally transmit the first image packet including image data for a first image obtained by capturing the screen and identification information, and may additionally receive the control packet including control data corresponding to the administrator's input for the first image.

In step 450, when the image is the image generated for the first time after the control event based on the control data is performed, the controlled terminal 130 may transmit the second image packet including image data for the second image obtained by capturing the screen and identification information to the remote support server 110.

In step 460, the controlled terminal 130 may determine whether or not to adjust the resolution of the images whose rendering is skipped based on the second image packet and the rendered first image.

In step 470, when the difference between the index of the rendered second image and the index of the first image based on the control packet received from the remote control device 110 is equal to or greater than a preset threshold, the controlled terminal 130 may adjust the resolution of the images for which rendering is skipped.

In step 480, when the difference between the index of the rendered second image and the index of the first image received from the remote control device 110 is less than or equal to the preset threshold, the controlled terminal 130 may maintain or increase the resolution of the images for which rendering is skipped.

In step 490, the controlled terminal 130 may transmit the images whose resolution is adjusted or maintained to the remote support server 110.

According to an embodiment, when the control packet is not transmitted from the remote support server 110, the controlled terminal 130 may readjust the resolution.

Figure 5:
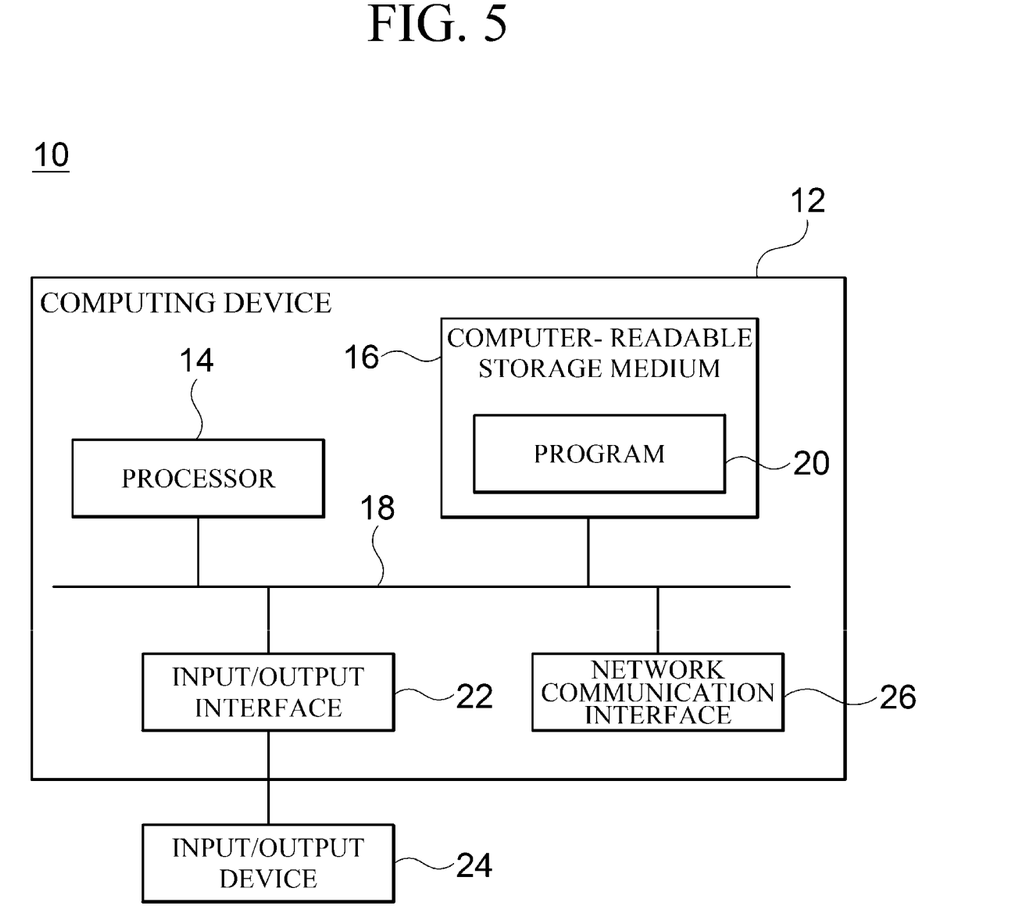
FIG. 5 is a block diagram illustratively describing a computing environment including a computing device according to an embodiment.

FIG. 5 is a block diagram for illustratively describing a computing environment including a computing device according to an embodiment.

FIG. 5 is a block diagram illustratively describing a computing environment including a computing device suitable for use in exemplary embodiments.

FIG. 5 is a block diagram illustratively describing a computing environment including a computing device suitable for use in exemplary embodiments. In the illustrated embodiment, each component may have different functions and capabilities other than those described below, and may include additional components in addition to those described below.

The illustrated computing environment 10 includes a computing device 12. In an embodiment, the computing device 12 may be one or more components included in a clustering device 100 illustrated in FIG. 1.

The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present disclosure has been described in detail through representative examples above, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents of the claims.

What is claimed is:

1. An apparatus for a remote support service, the apparatus comprising:
   one or more processors; and
   one or more communication interfaces, the one or more processors configured to:
   receive, from a controlled terminal, a first image packet including image data for a first image obtained by capturing a screen of the controlled terminal;
   render the first image based on the image data for the first image;
   transmit a control packet including control data corresponding to an administrator's input to the controlled terminal when the administrator's input for the rendered first image is detected;
   receive, from the controlled terminal, a second image packet including image data for a second image obtained by capturing the screen of the controlled terminal, index, index information of the second image, and identification information on whether or not the second image is an image generated for a first time after a control event, dependent on the control data transmitted in the control packet, is performed in the controlled terminal, the identification information having one of two values; and
   determine whether or not to render the second image based on a determination of which one of a first value and a second value is included in the identification information and, in response to the second image being determined to be rendered, render the second image based on the image data for the second image,
   wherein the identification information has the first value when the second image is the image generated corresponding to the first time, and has the second value when the second image is not the image generated corresponding to the first time.

2. The apparatus of claim 1, wherein the one or more processors are further configured to skip rendering of the second image when the second image is not the image generated for the first time.

3. The apparatus of claim 1, wherein the one or more processors are further configured to render the second image when the second image is the image generated for the first time.

4. The apparatus of claim 1, wherein the control packet further includes index information of the first image.

5. An apparatus for force running of remote support, the apparatus comprising:
   one or more processors; and
   one or more communication interfaces, wherein the one or more processors are configured to:
   transmit a first image packet including image data for a first image obtained by capturing a screen of a controlled terminal to a remote support server;
   receive a control packet including control data for the controlled terminal from the remote support server; and
   transmit, to the remote support server, a second image packet including image data for a second image obtained by capturing the screen of the controlled terminal, index information of the second image, and identification information indicating, by inclusion of a select one of a first value and a second value in the identification information, whether or not the second image is an image generated for a first time after a control event, dependent on the control data, is performed in the controlled terminal the index information having one of two values,
   wherein the one or more processors are configured to include the first value in the identification information when the second image is the image generated for the first time, and include the second value in the identification information when the second image is not the image generated for the first time.

6. The apparatus of claim 5, wherein the first image packet further includes index information of the first image; and the second image packet further includes index information of the second image.

7. The apparatus of claim 5, wherein the control packet further includes index information of the image rendered by the remote support server.

8. The apparatus of claim 7, wherein the one or more processors are further configured to compare the index information included in the control packet with the index information of the second image and adjust resolution of the second image when a comparison result is equal to or greater than a preset threshold.

9. A method for a remote support service performed by a remote support server that includes one or more processors and a memory storing one or more programs executed by the one or more processors, the method comprising:
   receiving, from a controlled terminal, a first image packet including image data for a first image obtained by capturing a screen of the controlled terminal;

rendering the first image based on the image data for the first image;

transmitting a control packet including control data corresponding to an administrator's input to the controlled terminal when the administrator's input for the rendered first image is detected;

receiving, from the controlled terminal, a second image packet including image data for a second image obtained by capturing the screen of the controlled terminal, index information of the second image, and identification information on whether or not the second image is an image generated for a first time after a control event, dependent on the control data transmitted in the control packet, is performed in the controlled terminal, the identification information having one of two values;

determining whether or not to render the second image based on a determination of which one of a first value and a second value is included in the identification information; and in response to the second image being determined to be rendered, rendering the second image based on the image data for the second image according, wherein the identification information has the first value when the second image is the image generated for the first time, and has the second value when the second image is not the image generated for the first time.

10. The method of claim 9, further comprising:
skipping, by the one or more processors, rendering of the second image when the second image is not the image generated for the first time.

11. The method of claim 9, further comprising:
rendering, by the one or more processors, the second image when the second image is the image generated for the first time.

12. The method of claim 9, wherein the control packet further includes index information of the first image.

13. A method for a remote support service performed by a controlled terminal that includes one or more processors and a memory storing one or more programs executed by the one or more processors, the method comprising:

transmitting a first image packet including image data for a first image obtained by capturing a screen of the controlled terminal to a remote support server;

receiving a control packet including control data for the controlled terminal from the remote support server; and transmitting, to the remote support server, a second image packet including image data for a second image obtained by capturing the screen of the controlled terminal, index information of the second image, and identification information indicating, by including a select one of a first value and a second value in the identification information, whether or not the second image is an image generated for a first time after a control event, dependent on the control data, is performed in the controlled terminal, the identification information having one of two values, wherein the including of the one of the first value and the second value in the identification information comprises including the first value in the identification information when the second image is the image generated for the first time, and including the second value in the identification information when the second image is not the image generated for the first time.

14. The method of claim 13, wherein the first image packet further includes index information of the first image; and the second image packet further includes index information of the second image.

15. The method of claim 13, wherein the control packet further includes index information of the image rendered by the remote support server.

16. The method of claim 15, further comprising:
by the one or more processors, comparing the index information included in the control packet with the index information of the second image and adjusting resolution of the second image when a comparison result is equal to or greater than a preset threshold.

* * * * *